US008908719B2

United States Patent
Liao et al.

(10) Patent No.: US 8,908,719 B2
(45) Date of Patent: Dec. 9, 2014

(54) CLOCK RATE CONTROLLER AND METHOD THEREOF AND ELECTRONIC DEVICE THEREOF

(71) Applicant: C-Media Electronics Inc., Taipei (TW)

(72) Inventors: Jung-Fu Liao, Taipei (TW); Hung-Chi Huang, New Taipei (TW)

(73) Assignee: C-Media Electronics Inc., Taipei (TW)

( * ) Notice: Subject to any disclaimer, the term of this patent is extended or adjusted under 35 U.S.C. 154(b) by 56 days.

(21) Appl. No.: 13/713,017

(22) Filed: Dec. 13, 2012

(65) Prior Publication Data

US 2013/0170369 A1    Jul. 4, 2013

(30) Foreign Application Priority Data

Jan. 4, 2012 (TW) .............................. 101100353 A (51) Int. Cl.
*H04J 3/06* (2006.01)
*G06F 5/06* (2006.01)
*G06F 13/40* (2006.01)

(52) U.S. Cl.
CPC ............ *H04L 41/081* (2013.01); *H01N 5/0736* (2013.01); *H04J 3/0635* (2013.01); *G06F 5/06* (2013.01); *G06F 13/40* (2013.01)
USPC ........................................................ 370/516

(58) Field of Classification Search
None
See application file for complete search history.

(56) References Cited

U.S. PATENT DOCUMENTS

| 5,563,877 | A  | * | 10/1996 | Van Tetering et al. | 370/419 |
| 6,563,816 | B1 | * | 5/2003 | Nodoushani et al. | 370/352 |
| 2002/0024970 | A1 | * | 2/2002 | Amaral et al. | 370/468 |
| 2004/0057445 | A1 | * | 3/2004 | LeBlanc | 370/412 |
| 2007/0047575 | A1 | * | 3/2007 | Cui | 370/465 |
| 2013/0336333 | A1 | * | 12/2013 | LeBlanc | 370/412 |

* cited by examiner

*Primary Examiner* — Christopher Crutchfield
(74) *Attorney, Agent, or Firm* — Li & Cai Intellectual Property (USA) Office (57) ABSTRACT

An exemplary embodiment of the present disclosure illustrates a clock rate control method. Firstly, a usage of a first input first output (FIFO) buffer in an electronic device is detected. Then, whether the usage falls within a first specific interval is determined, wherein the first specific interval has a first upper limit value and a first lower limit value. When the usage is larger than the first upper limit value, a clock rate of the inner device of the electronic device is increased; when the usage is less than the first lower limit value, the clock rate is decreased.

16 Claims, 5 Drawing Sheets

CLOCK RATE CONTROLLER AND METHOD THEREOF AND ELECTRONIC DEVICE THEREOF

BACKGROUND

1. Technical Field

The present disclosure relates to a clock rate controller, in particular, to a clock controller for regulating a clock rate of an internal device (i.e. for controlling the speed which the internal device processes the packet) in an electronic device to adjust a usage of the first-input-first-output (FIFO) buffer, and a method and an electronic device thereof, wherein the usage is the number of the registers of the FIFO buffer in which the packets have been stored.

2. Description of Related Art

With the technology development, the new electronic device products are provided in the market frequently, and the high speed transmission interfaces of different kinds are specified and proposed minutely. However, the clock rate associated with the internal device of the current electronic device cannot keep up with the data transmission speed of the host (p.s. the host can be the hub or the computer according to the different condition), and thus a clock rate controller and the FIFO buffer are disposed in the electronic device.

The current clock rate controller can track the packet transmission speed of the host, and since the FIFO buffer can buffer the packets meanwhile, the internal device has a regulation time to control the phase lock loop (PLL) thereof based upon the control signal of the clock rate controller, such that the clock rate that the internal device processes the packet stored in the FIFO buffer is adjusted. Generally speaking, the data transmission speed of the computer is more stable. Once the clock rate of the internal device keeps up with the packet transmission speed of the computer, the usage of the FIFO buffer maintains a specific level.

Troublesomely, the number of the ports providing the electronic device to connect with the computer is limited, and thus there is a hub connected between the computer and the electronic device. Taking the universal serial bus (USB) hub for example, if the USB hub is not designed well, it causes the start of frame (SOF) which is transmitted to the electronic device from the hub cannot meet the specification of one SOF per microsecond and the normal standard of 500 nanosecond tolerance.

When the transmission speed of the SOF is too high (i.e. the packet transmission speed of the hub is too high), and the FIFO buffer does not have enough storage space and the well-designed processing mechanism, it causes the overflow of the FIFO buffer, such that some packets are discarded. The electronic device can be the USB speaker for example, and since some audio packets are discarded, it causes the sound glitch and the poor audio quality.

In addition, the conventional electronic device can make the clock rate of the internal device keep up with the packet transmission speed of the host to adjust the usage of the FIFO buffer by controlling the PLL, but after the clock rate of the internal device keeps up with the packet transmission speed of the host, the conventional electronic device does not pull the usage of the FIFO buffer back to a specific interval. Thus, the usage of the FIFO buffer of the conventional electronic device may maintain a level near the overflow edge. Meanwhile, if the packet transmission speed of the host is increased, there is not enough for the internal device to process the packet stored in the FIFO buffer. Accordingly, the FIFO buffer overflows, and some packets are discarded.

SUMMARY

An exemplary embodiment of the present disclosure provides a clock rate control method. Firstly, a usage of a first-input-first-output (FIFO) buffer in an electronic device is detected. Whether the usage falls within a first specific interval is determined, wherein the first specific interval has a first upper limit value and a first lower limit value. When the usage is larger than the first upper limit value, a clock rate of an internal device of the electronic device is increased. When the usage is less than the first lower limit value, the clock rate is decreased.

In one exemplary embodiment of the present disclosure, when the usage falls within the first specific interval, the clock rate is maintained.

In another one exemplary embodiment of the present disclosure, when the usage falls within the first specific interval, a deviation value between a current differential value and a previous differential value is calculated, and whether the deviation value falls within a second specific interval is determined, wherein the differential value is a difference between a write pointer and a read pointer of the FIFO buffer, and the second specific interval has a second upper limit value and a second lower limit value. When the deviation value is larger than the second upper limit value, the clock rate is increased. When the deviation value is less than the second lower limit value, the clock rate is decreased. When the deviation value falls within the second specific interval, the clock rate is maintained.

Other exemplary embodiments of the present disclosure further provide a clock rate controller of executing the above method, and an electronic device having this clock rate controller.

To sum up, the clock rate controller and method thereof according to exemplary embodiments of the present disclosure can adjust the usage of FIFO buffer by regulating the clock of the internal device, such that the usage of the FIFO buffer maintains within the first specific interval. In addition, the overflow probability of the FIFO buffer is decreased, and thus the electronic device discards the packet little.

In order to further understand the techniques, means and effects the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Reference will now be made in detail to the exemplary embodiments of the present disclosure, examples of which are illustrated in the accompanying drawings. Wherever possible, the same reference numbers are used in the drawings and the description to refer to the same or like parts.

An exemplary embodiment of the present disclosure provides a clock rate controller. The clock rate controller regulates the clock rate of the internal device to adjust the usage of the FIFO buffer by controlling the PLL of the internal device in the electronic device, such that the conditions of overflow and the usage over-oscillation associated with the FIFO buffer can be avoided. Moreover, an exemplary embodiment of the present disclosure provides a clock rate control method executed in the clock rate controller, wherein the clock rate control method is a software, hardware, or firmware based implementation in the clock rate controller.

[Exemplary Embodiment of Electronic Device]

Figure 1:
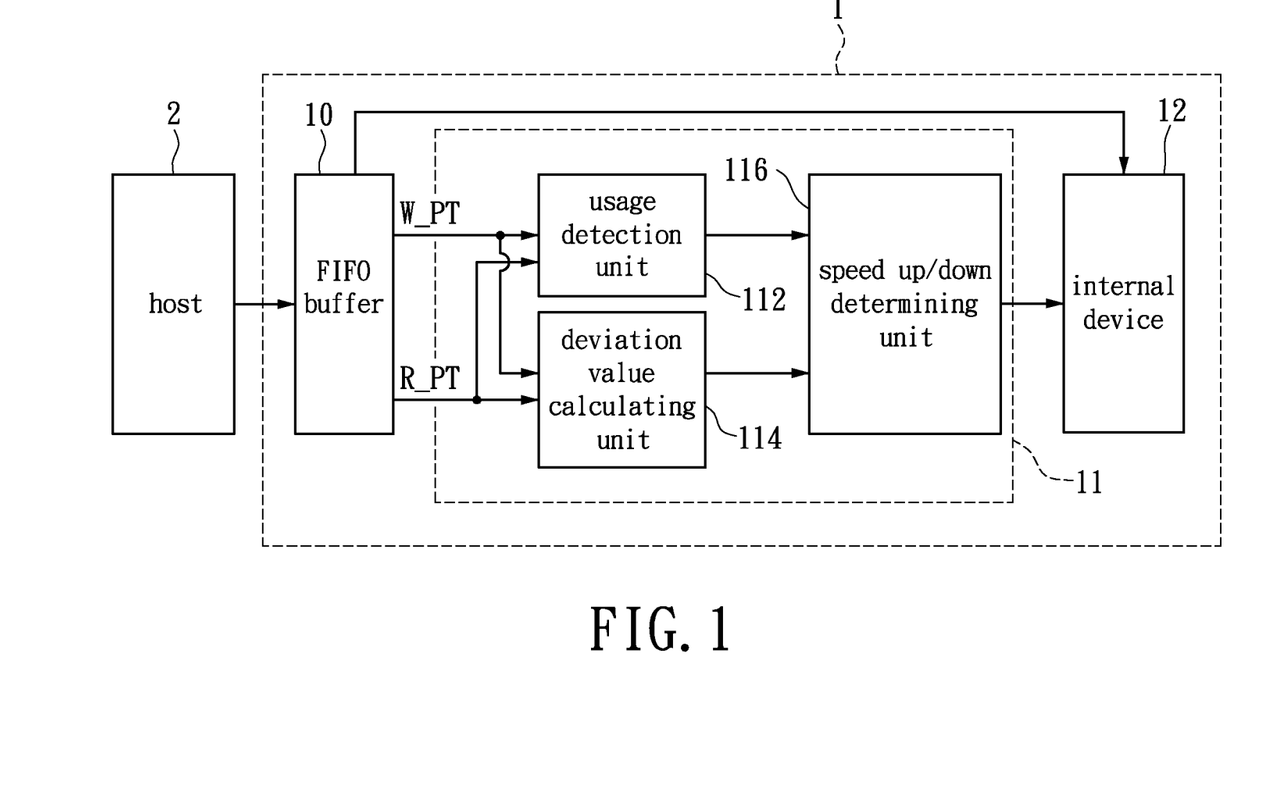
FIG. 1 is a block diagram of an electronic device according to one exemplary embodiment of the present disclosure.

FIG. 1 is a block diagram of an electronic device according to one exemplary embodiment of the present disclosure. The electronic device 1 comprises a FIFO buffer 10, a clock rate controller 11, and an internal device 12. The electronic device 1 is electrically connected to the FIFO buffer in the host 2, for example through the transmission interface (not shown in FIG. 1). The clock rate controller 11 is electrically connected to the FIFO buffer 10 and the internal device 12, and the internal device 12 is further electrically connected to the FIFO buffer 10.

The FIFO buffer 10 stores the packet transmitted from the host, wherein the host 2 may be a hub, a computer, or the other data transmission device according to the different condition. Concretely, the FIFO buffer 10 receives a frame from the host every time interval, and stores the packets of the frame. Since the host 2 sends the frame every time interval, the internal device 12 can read and process these packets in the time interval to avoid the overflow of the FIFO buffer 10, and thus the packet may not be discarded.

Generally speaking, a write pointer W_PT and a read pointer R_PT are used in the FIFO buffer 10 to respectively present the packet writing and reading addresses. In short, the write pointer W_PT is a packet buffer index of the buffer in which the packet can be written, and the read pointer R_PT is a packet buffer index of the buffer from which the internal device 12 reads the packet.

In addition, the clock rate of the internal device 12 can be regulated by the clock rate controller 11, for example the internal device 12 has a PLL, and the clock rate controller 11 controls the PLL of the internal device 12 to regulate the clock rate of the internal device 12. Furthermore, the type of the internal device 12 corresponds to that of the electronic device 1. For example, the electronic device 1 is USB speaker, and the internal device 12 is a speaker module with an audio processing chip; or alternatively, the electronic device 1 is a PCMIA wireless network card, and the internal device 12 is wireless transceiving chip module.

In one exemplary embodiment, the clock rate controller 11 detects the usage of the FIFO buffer 10 falls within a first specific interval to determine whether the clock rate of the internal device 12 should be regulated or not, wherein the first specific interval has a first upper limit value and a first lower limit value. When the usage of the FIFO buffer 10 falls within the specific interval (i.e. the usage is larger than or equal to the first lower limit value and less than or equal to the first upper limit value), the clock rate controller 11 maintains the clock rate of the internal device 12. When the usage is larger than the first upper limit value, the clock rate controller 11 controls the PLL of the internal device 12 to increase the clock rate of the internal device 12. By contrast, when the usage is less than the first lower limit value, the clock rate controller 11 controls the PLL of the internal device 12 to decreases the clock rate of the internal device 12.

In addition, in the exemplary embodiment, the first upper limit value can be the middle usage level (i.e. the half of packet buffer number of the FIFO buffer 10) adding a first specific value, and the first lower limit value can be middle usage level subtracting a second specific value, wherein the first specific value and the second specific value are positive integers, and first specific value can be different from the second specific value, for example respectively 5 and 4. In short, the range of the first specific interval is not used to limit the present disclosure. In a special case, the first specific value can be zero, and the first specific interval can be an arbitrary level.

In another one implementation, the clock rate controller 11 detects whether the usage of the FIFO buffer 10 falls within the first specific interval, and detects whether a difference between write pointer and the read pointer is increased or decreased, so as to determines whether the clock rate of the internal device 12 should be regulated or not. When the usage falls within the first specific interval, the clock rate controller 11 determines whether a deviation value D3 between a current differential value D1 and a previous differential value D2 falls within a second specific interval, wherein the current differential value D1 is the current difference between the write pointer W_PT and the read pointer R_PT, the previous differential value D2 is the previous difference between the write pointer W_PT and the read pointer R_PT, and the second specific interval has a second upper limit value and a second lower limit value. For example, the current differential value D1 associated with the write pointer W_PT and the read pointer R_PT is the usage when the current frame is received, and the previous differential value D2 associated with the write pointer W_PT and the read pointer R_PT is the usage when the previous frame is received.

When the deviation value D3 falls within the second specific interval (i.e. the deviation value D3 is larger than or equal to the second lower limit value and less than or equal to the second upper limit value), the clock rate controller 11 maintains the clock rate of the internal device 12. When the deviation value D3 is larger than the second upper limit value, the clock rate controller 11 controls the PLL of the internal device 12 to increase the clock rate of the internal device 12. When the deviation value D3 is less than the second lower limit value, the clock rate controller 11 controls the PLL of the internal device 12 to decrease the clock rate of the internal device 12. When the usage is larger than the first upper limit value, the clock rate controller 11 controls the PLL of the internal device 12 to increase the clock rate of the internal device 12. By contrast, when the usage is less than the first lower limit value, the clock rate controller 11 controls the PLL of the internal device 12 to decreases the clock rate of the internal device 12.

In addition, in the exemplary embodiment, the first upper limit value can be the middle usage level adding a first specific value, and the first lower limit value can be middle usage level subtracting a second specific value, wherein the first and second specific values can be positive integers. The first and second specific value can be identical to each other, for example 5; or alternatively, different from each other, for example respectively 5 and 4. The second upper limit value is a positive integer, and the second lower limit value is a negative integer corresponding to the second upper limit value, for example respectively +2 and −2; or alternatively, the second upper and lower limit values are respectively a positive and a negative integers without having correspondence to each other, for example respectively +3 and −2. It is noted that, the ranges of the first and second specific intervals are not used to limit the present disclosure. In a special case, the first specific value can be zero, and the first specific interval can be an arbitrary level.

Next, the implementation details of the clock rate controller 11 are illustrated as follows. The clock rate controller 11 comprises a usage detection unit 112, a deviation value calculating unit 114, and a speed up/down determining unit 116. The usage detection unit 112 and the deviation value calculating unit 114 are electrically connected to the FIFO buffer 10, and the speed up/down determining unit 116 is electrically connected to the usage detection unit 112, the deviation value calculating unit 114, and the internal device 116.

The usage detection unit 112 receives the write pointer W_PT and the read pointer R_PT to detect the usage of the FIFO buffer 10, and outputs the detected usage to the speed up/down determining unit 116. It is noted that the usage detection unit 112 can obtain the difference between the write pointer W_PT and the read pointer R_PT minutely to update the usage of the FIFO buffer 10. In short, the difference between the write pointer W_PT and the read pointer R_PT presents the usage.

The deviation value calculating unit 114 is used to calculate the current differential value D1 associated with the write pointer W_PT and the read pointer R_PT (i.e. D1=W_PT−R_PT), and stores the previous differential value D2 associated with the write pointer W_PT and the read pointer R_PT. Next, the deviation value calculating unit 114 calculates the deviation value D3 between the current differential value D1 and the previous differential value D2 (i.e. D3=D1−D2), and outputs the deviation value D3 to the speed up/down determining unit 116. In short, the deviation value D3 presents the difference between the current usage and the previous usage.

To avoid the usage of the FIFO buffer 10 is maintained a level near the overflow edge, the speed up/down determining unit 116 determines whether the detected usage falls within the first specific interval to judge whether the clock rate of the internal device 12 should be regulated or not, such that the usage exceeding the first specific interval can be regulated to fall within the first specific interval. When the detected usage is larger than the first upper limit value of the first specific interval, the speed up/down determining unit 116 controls the PLL of the internal device 12 to increase the clock rate of the internal device 12. By contrast, when the detected usage is less than the first lower limit value of the first specific interval, the speed up/down determining unit 116 controls the PLL of the internal device 12 to decrease the clock rate of the internal device 12.

When the usage falls within the first specific interval, the speed up/down determining unit 116 further detects whether the deviation value D3 falls within the second specific interval to determines whether the clock rate of the internal device 12 should be regulated or not, such that the oscillation of usage may be reduced. When the clock rate of the internal device 12 is too fast, the usage of the FIFO buffer 10 is decreased, and the deviation value D3 is thus decreased; by contrast, when clock rate of the internal device 12 is too slow, the usage of the FIFO buffer 10 is increased, and the deviation value D3 is thus increased. Therefore, to suppress continuous usage increase or decrease of the usage associated with the FIFO buffer 10, the deviation value D3 is forced to fall within the second specific interval.

When the deviation value D3 falls within the second specific interval, it means the usage of the FIFO buffer 10 may not increase and decrease continuously, and thus the speed up/down determining unit 116 maintains the clock rate of the internal device 12. When the deviation value D3 is larger than the second upper limit value, it means the clock rate of the internal device 12 is too slow and the usage of the FIFO buffer 10 increases continuously, and thus the speed up/down determining unit 116 controls the PLL of the internal device 12 to increase the clock rate of the internal device 12. By contrast, when the deviation value D3 is less than the second lower limit value, it means the clock rate of the internal device 12 is too fast and the usage of the FIFO buffer 10 decreases continuously, and thus the speed up/down determining unit 116 controls the PLL of the internal device 12 to decrease the clock rate of the internal device 12. It is noted that, regardless of the oscillation of the usage, the deviation value calculating unit 114 in FIG. 1 can be removed, and meanwhile the when the usage falls within the first specific interval, the speed up/down determining unit 116 just maintains the clock rate of the internal device 12 without further detecting whether the deviation value D3 falls within the second specific interval.

It is noted that though the clock rate controller 11 in FIG. 1 is independent outside the internal device 12, for a general design of the internal device 12, the clock rate controller 11 may be integrated into the internal device 12 to form an independent chip or module. Moreover, in the other designs, the FIFO buffer 10 and the clock controller 11 may be further integrated into the internal device 12 to form an independent chip or module. In short, the exemplary embodiment of FIG. 1 is not used to limit the present disclosure.

[Exemplary Embodiment of Clock Rate Control Method]

Figure 2:
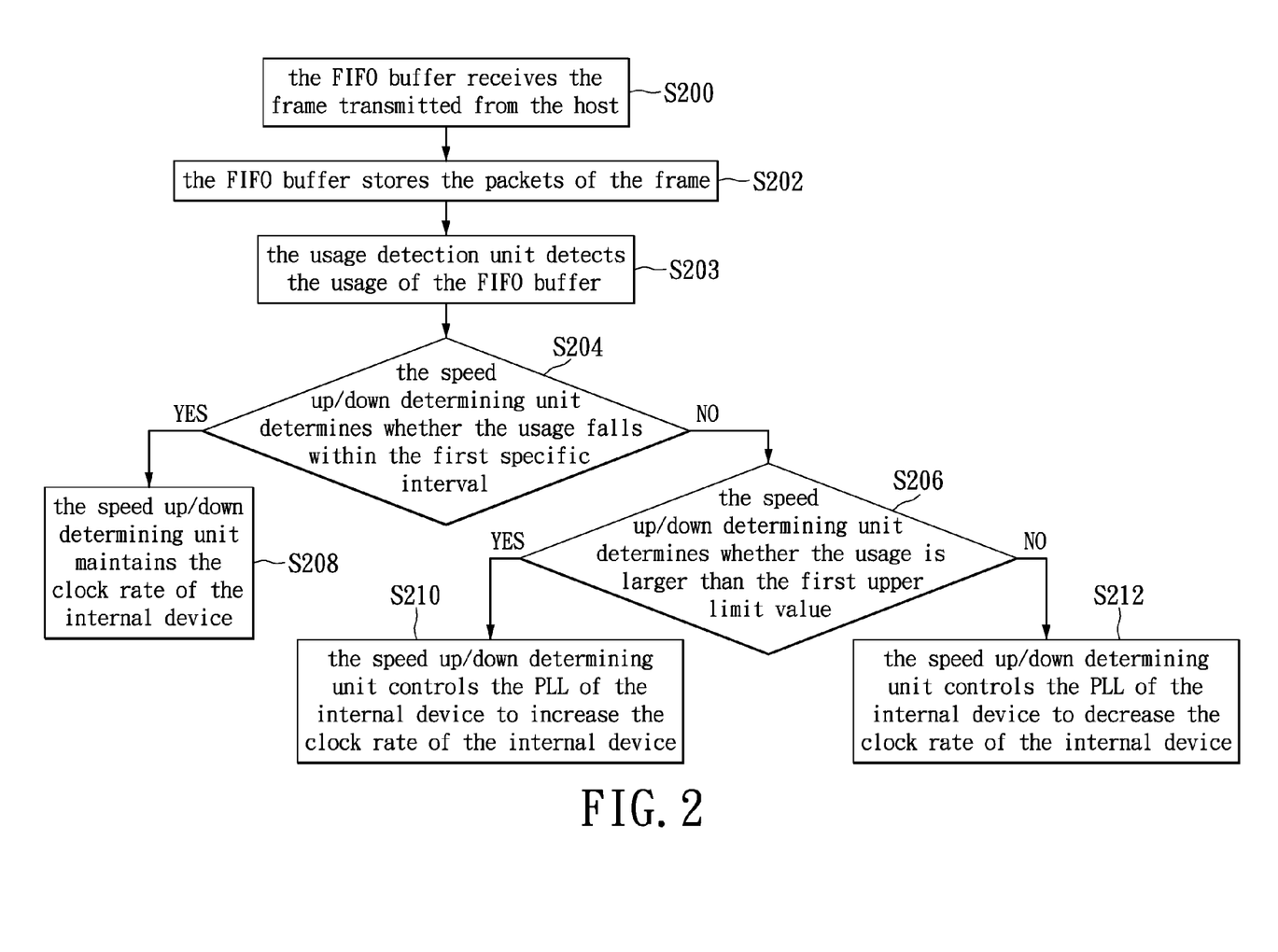
FIG. 2 is a flow chart of a clock rate control method according to one exemplary embodiment of the present disclosure.

Referring to FIG. 1 and FIG. 2, FIG. 2 is a flow chart of a clock rate control method according to one exemplary embodiment of the present disclosure. Steps S203 through S212 in the clock rate control method of FIG. 2 can be executed by the clock rate controller 11 of FIG. 1. According to the clock rate control method of FIG. 2, the clock rate controller 11 in FIG. 1 does not have the deviation value calculating unit 114, and when the usage falls within the first specific interval, the speed up/down determining unit 116 of the clock rate controller 11 does not detect whether the deviation value D3 between the current differential value D1 and the previous differential value D2 associated with the write pointer W_PT and the read pointer R_PT falls within the second specific interval.

Firstly, at step S200, the FIFO buffer 10 receives the frame transmitted from the host 2. Then, at step S202, the FIFO buffer 10 stores the packets of the frame. Next, at step S203, the usage detection unit 112 detects the usage of the FIFO buffer 10. At step S204, the speed up/down determining unit 116 determines whether the usage falls within the first specific interval. When the usage of the FIFO buffer 10 falls within the first specific interval, step S208 is executed; by contrast, when the usage of the FIFO buffer 10 does not fall within the first specific interval, step S206 is executed.

At step S208, the speed up/down determining unit 116 maintains the clock rate of the internal device 12. At step S206, the speed up/down determining unit 116 determines whether the usage is larger than the first upper limit value. When the usage is larger than the first upper limit value, step S210 is executed; by contrast, when the usage is not larger than the first upper limit value, it means the usage is less than the first lower limit value, and step S212 is executed. At step S210, the speed up/down determining unit 116 controls the PLL of the internal device 12 to increase the clock rate of the internal device 12. At step S212, the speed up/down determining unit 116 controls the PLL of the internal device 12 to decrease the clock rate of the internal device 12.

[Another One Exemplary Embodiment of Clock Rate Control Method]

Figure 3:
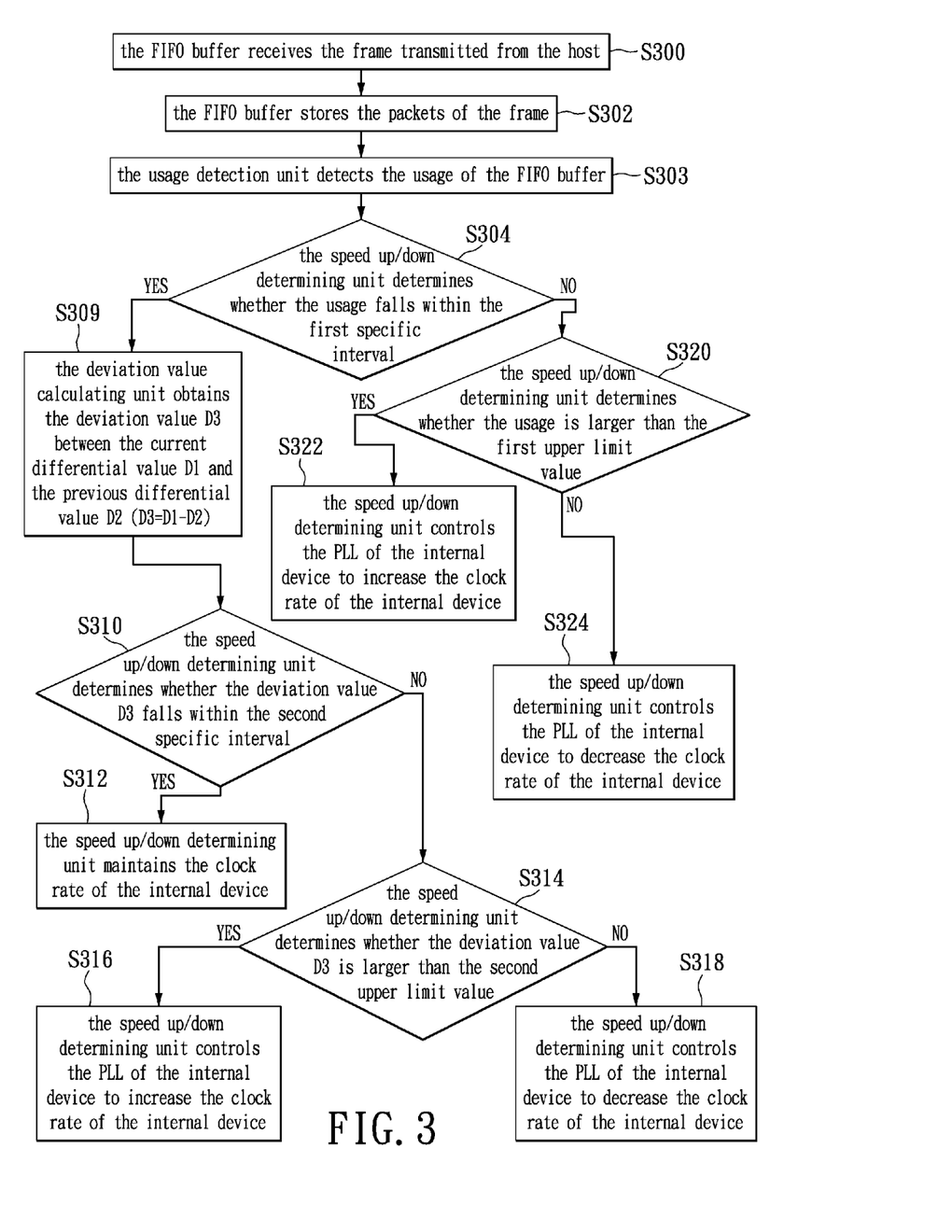
FIG. 3 is a flow chart of a clock rate control method according to another one exemplary embodiment of the present disclosure.

Referring to FIG. 1 and FIG. 3, FIG. 3 is a flow chart of a clock rate control method according to another one exemplary embodiment of the present disclosure. Steps S303 through S324 of the clock rate control method in FIG. 3 can be executed by the clock rate controller 11 in FIG. 1, and no elements is removed from the clock rate controller 11.

Firstly, at step S300, the FIFO buffer 10 receives the frame transmitted from the host 2. Next, at step S302, the FIFO buffer 10 stores the packets of the frame. Then, at step S303, the usage detection unit 112 detects the usage of the buffer. At step S304, the speed up/down determining unit 116 determines whether the usage falls within the first specific interval. When the usage of the FIFO buffer 10 falls within the first specific interval, step 309 is executed; by contrast, when the usage of the FIFO buffer 10 does not fall within the first specific interval, step S320 is executed.

At step S309, the deviation value calculating unit 114 obtains the deviation value D3 between the current differential value D1 and the previous differential value D2 associated with the write pointer W_PT and the read pointer R_PT. At step S310, the speed up/down determining unit 116 determines whether the deviation value D3 between the current differential value D1 and the previous differential value D2 associated with the write pointer W_PT and the read pointer R_PT falls within the second specific interval. When the deviation value D3 falls within the second specific interval, step S312 is executed; by contrast, when the deviation value D3 does not fall within the second specific interval, step S314 is executed. At step S312, the speed up/down determining unit 116 maintains the clock rate of the internal device 12. At step S314, the speed up/down determining unit 116 determines whether the deviation value D3 is larger than the second upper limit value. When the deviation value D3 is larger than the second upper limit value, step S316 is executed; by contrast, when the deviation value D3 is not larger than the second upper limit value, it means the deviation value D3 is less than the second lower limit value step S318 is executed.

At step S320, the speed up/down determining unit 116 determines whether the usage is larger than the first upper limit value. When the usage is larger than the first upper limit value, step S322 is executed; by contrast, when the usage is not larger than the first upper limit value, it means the usage is less than the first lower limit value, and step S324 is executed. At step S316 or S322, the speed up/down determining unit 116 controls the PLL of the internal device 12 to increase the clock rate of the internal device 12. At step S318 or S324, the speed up/down determining unit 116 controls the PLL of the internal device 12 to decrease the clock rate of the internal device 12.

[Possible Result of Exemplary Embodiment]

Figure 4:
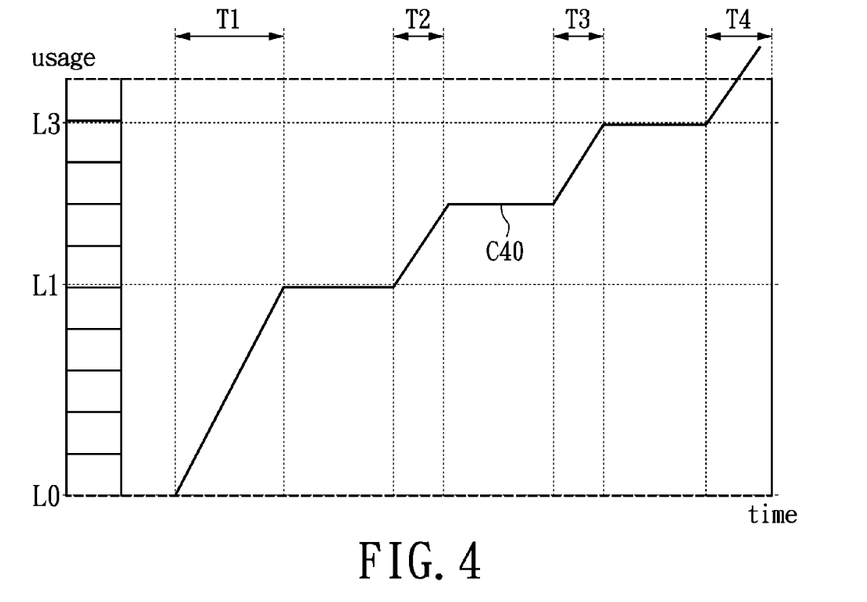
FIG. 4 is curve diagram showing the usage and time when the clock rate controller merely uses the clock rate control method of keeping up with the packet transmission speed of the host.

Referring to FIG. 4, FIG. 4 is curve diagram showing the usage and time when the clock rate controller merely uses the clock rate control method of keeping up with the packet transmission speed of the host. From observation of curve C40, the internal device needs a regulation time period (such as one of regulation time periods T1 through T4) to regulate the clock rate thereof. For example, after the regulation time period T1 elapses, the clock rate of the internal device can keep up with the packet transmission rate of the host. Thus, the usage of the FIFO buffer may not increase and decrease, and stably maintains a specific level (such as L1).

However, in the regulation time period T1, the packets may be still stored by the FIFO buffer continuously, but due to that the clock rate of the internal device is too slow, the usage of the FIFO buffer increases, and thus the usage of the FIFO buffer stably maintains the specific level L1 larger than the previous specific level L0. If the previous usage stably maintains the specific level L3 which is near the overflow edge, in the next regulation time period T4, the overflow of the FIFO buffer will occur due to that the storage space is not enough to store the packets received in the regulation time period T4 (i.e. the overflow of the FIFO buffer occurs before the clock rate keeps up the packet transmission rate of the host), and some packets will be discarded.

Figure 5:
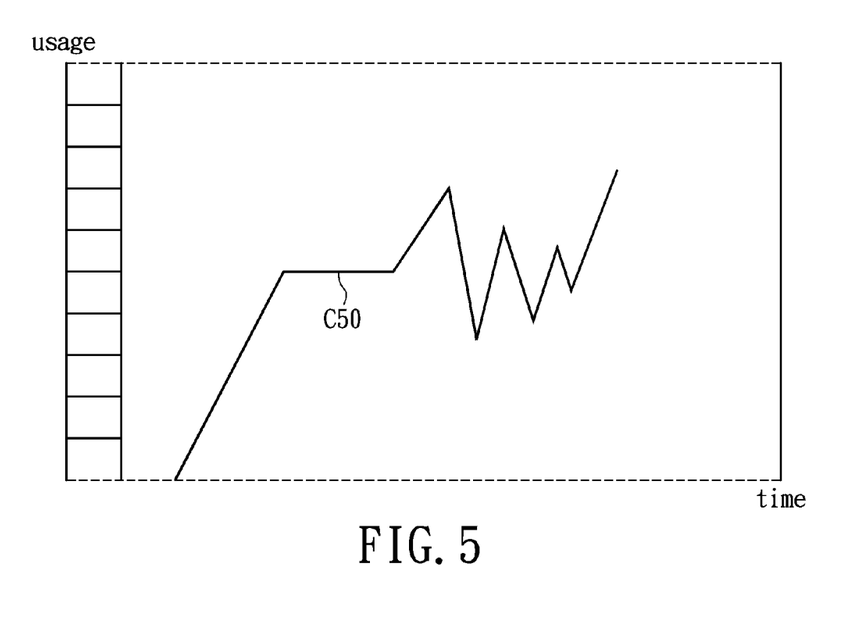
FIG. 5 is curve diagram showing the usage and time when the clock rate controller uses the clock rate control method of FIG. 2.

Referring FIG. 5, FIG. 5 is curve diagram showing the usage and time when the clock rate controller uses the clock rate control method of FIG. 2. From the observation of curve 50, when the usage of the FIFO buffer is larger than the first upper limit value of the first specific interval, the clock rate controller increases the clock rate of the internal device, to make the usage of FIFO buffer fall within the first specific interval. However, after the usage of the FIFO buffer falls within the first specific interval again, the clock rate of the internal device may be too fast. Meanwhile, if there is no mechanism of reducing the clock rate of the internal device, the clock rate controller cannot decrease the clock rate of the internal device to make the usage fall within the first specific interval until the usage of the FIFO buffer is less than the first lower limit value of the first specific interval. Next, after the usage of the FIFO buffer falls within the first specific interval again, the clock rate of the internal device may too slow. Meanwhile, if there is no mechanism of reducing the clock rate of the internal device, the clock rate controller cannot increase the clock rate of the internal device to make the usage fall within the first specific interval until the usage of the FIFO buffer is larger than the first upper limit value of the first specific interval. Accordingly, the usage of the FIFO buffer may be over oscillated, and it is hard for the usage to stably maintain the specific level.

Figure 6:
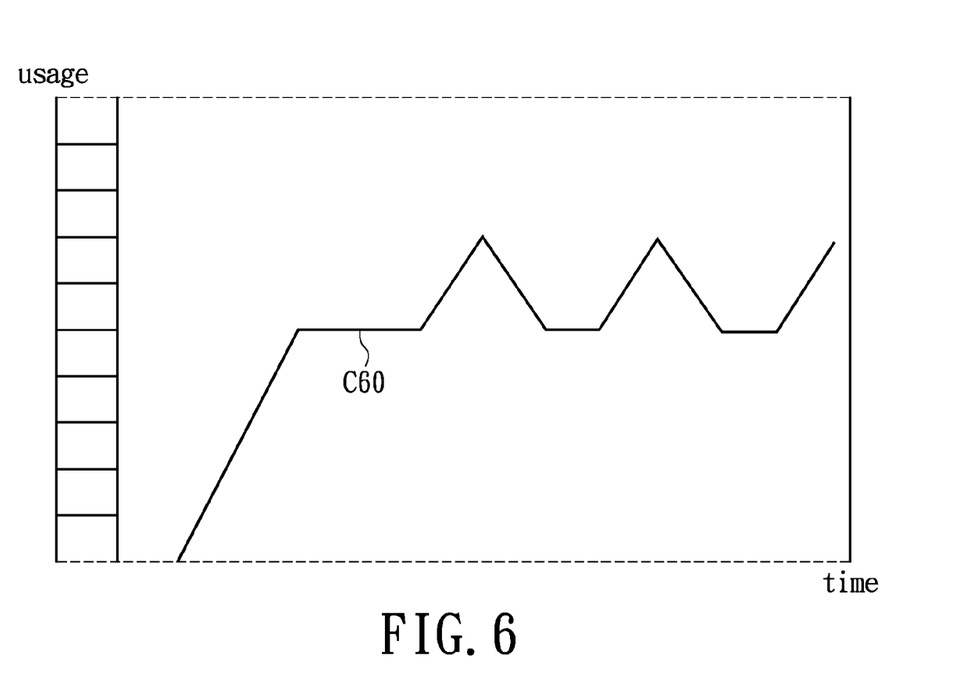
FIG. 6 is curve diagram showing the usage and time when the clock rate controller uses the clock rate control method of FIG. 3.

Next, referring to FIG. 6, FIG. 6 is curve diagram showing the usage and time when the clock rate controller uses the clock rate control method of FIG. 3. Compared to curve 50, from the observation of curve 60, after the usage of the FIFO buffer falls within the first specific interval again, the clock rate controller detects whether the deviation value D3 falls within the second specific interval to determines whether the usage of the FIFO buffer increases or decreases continuously, so as to judge whether the clock rate should be increased, decreased, or maintained. Thus the usage of the FIFO buffer may stably fall within the first specific interval, and the over-oscillation of the usage can be avoided.

In summary, the clock rate controller and method thereof according to one exemplary embodiment of the present disclosure can regulate the clock rate of the internal device to adjust the usage of the FIFO buffer, such that the usage of the FIFO buffer can fall within the first specific interval. The clock rate controller and method thereof according to another one exemplary embodiment of the present disclosure not only makes the usage of the FIFO buffer can fall within the first specific interval, but also avoid the over-oscillation of the usage of the FIFO buffer. In addition, the electronic device provided by one exemplary embodiment of the present disclosure adapts the above clock rate controller and the method thereof. Compared to the conventional electronic device, the electronic device provided by one exemplary embodiment of the present disclosure is more suitable to be connected to the host with the unstable packet transmission rate, and the probability that packets are discarded due to the overflow of the FIFO buffer is reduced.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A clock rate control method, comprising:
    detecting a usage of a first-input-first-output (FIFO) buffer in an electronic device;
    determining whether the usage falls within a first specific interval, wherein the first specific interval has a first upper limit value and a first lower limit value;
    when the usage is larger than the first upper limit value, increasing a clock rate of an internal device of the electronic device;
    when the usage is less than the first lower limit value, decreasing the clock rate;
    when the usage falls within the first specific interval, calculating a deviation value between a current differential value and a previous differential value, and determining whether the deviation value falls within a second specific interval, wherein the differential value is a difference between a write pointer and a read pointer of the FIFO buffer, and the second specific interval has a second upper limit value and a second lower limit value;
    when the deviation value is larger than the second upper limit value, increasing the clock rate;
    when the deviation value is less than the second lower limit value, decreasing the clock rate; and
    when the deviation value falls within the second specific interval, maintaining the clock rate.

2. The clock rate control method according to claim 1, further comprising:
    when the usage falls within the first specific interval, maintaining the clock rate.

3. The clock rate control method according to claim 1, wherein the first upper limit value is the half of packet buffer number of the FIFO buffer adding a first specific value, and the first lower limit value is the half of packet buffer number of the FIFO buffer subtracting a second specific value, wherein the first specific value and the second specific value are positive integers.

4. The clock rate control method according to claim 1, wherein the second upper limit value is a positive integer, and the second lower limit value is a negative integer.

5. A clock rate controller, comprising:
    a usage detection unit, electrically connected to a FIFO buffer of an electronic device, used to detect a usage of the FIFO buffer; and
    a speed up/down determining unit, electrically connected to the usage detection unit and an internal device of the electronic device, used to detect whether the usage falls within a first specific interval, wherein the first specific interval has a first upper limit value and a first lower limit value;
    a deviation value calculating unit, electrically connected to the FIFO buffer and the speed up/down determining unit, used to calculate a deviation value between a current differential value and a previous differential value, wherein the differential value is a difference between a write pointer and a read pointer of the FIFO buffer;
    wherein when the usage is larger than the first upper limit value, the speed up/down determining unit increases a clock rate of the internal device of the electronic device; when the usage is less than the first lower limit value, the speed up/down determining unit decreases the clock rate;
    wherein when the usage falls within the first specific interval, the speed up/down determining unit determines whether the deviation value falls within a second specific interval, wherein the second specific interval has a second upper limit value and a second lower limit value; when the deviation value is larger than the second upper limit value, the speed up/down determining unit increases the clock rate; when the deviation value is less than the second lower limit value, the speed up/down determining unit decreases the clock rate; when the deviation value falls within the second specific interval, the speed up/down determining unit maintains the clock rate.

6. The clock rate controller according to claim 5, wherein when the usage falls within the first specific interval, the speed up/down determining unit maintains the clock rate.

7. The clock rate controller according to claim 5, wherein the first upper limit value is the half of packet buffer number of the FIFO buffer adding a first specific value, and the first lower limit value is the half of packet buffer number of the FIFO buffer subtracting a second specific value, wherein the first specific value and the second specific value are positive integers.

8. The clock rate controller according to claim 5, wherein the second upper limit value is a positive integer, and the second lower limit value is a negative integer.

9. An electronic device, used to connect a host, comprising:
    a FIFO buffer, electrically connected to the host, used to store a plurality of packet from the host;
    a clock rate controller, electrically connected to the FIFO buffer, used to determines whether a usage of the FIFO buffer falls within a first specific interval, wherein the first specific interval has a first upper limit value and a first lower limit value; and
    an internal device, electrically connected to the clock rate controller and the FIFO buffer, used to process the packet from the FIFO buffer according to a clock rate;
    wherein when the usage is larger than the first upper limit value, the clock rate controller increases the clock rate; when the usage is less than the first lower limit value, the clock rate controller decreases the clock rate;
    wherein when the usage falls within the first specific interval, the clock rate controller maintains the clock rate;
    wherein the clock rate controller determines whether a deviation value between a current differential value and a previous differential value falls within a second specific interval, wherein the differential value is a difference between a write pointer and a read pointer of the FIFO buffer, and the second specific interval has a second upper limit value and a second lower limit value;
    when the usage falls within the first specific interval, the speed up/down determining unit determines whether the deviation value falls within a second specific interval, wherein the second specific interval has a second upper limit value and a second lower limit value; when the deviation value is larger than the second upper limit value, the clock rate controller increases the clock rate; when the deviation value is less than the second lower limit value, the clock rate controller decreases the clock rate; when the deviation value falls within the second specific interval, the clock rate controller maintains the clock rate.

10. The electronic device according to claim 9, wherein the clock rate controller comprises:
 a usage detection unit, electrically connected to the FIFO buffer, used to detect the usage; and
 a speed up/down determining unit, electrically connected to the usage detection unit and the internal device, used to detect whether the usage falls within the first specific interval;
 wherein when the usage is larger than the first upper limit value, the speed up/down determining unit increases the clock rate; when the usage is less than the first lower limit value, the speed up/down determining unit decreases the clock rate.

11. The electronic device according to claim 10, wherein when the usage falls within the first specific interval, the speed up/down determining unit maintains the clock rate.

12. The electronic device according to claim 10, wherein the clock rate controller further comprising:
 a deviation value calculating unit, electrically connected to the FIFO buffer and the speed up/down determining unit, used to calculate a deviation value between a current differential value and a previous differential value, wherein the differential value is a difference between a write pointer and a read pointer of the FIFO buffer;
 wherein when the usage falls within the first specific interval, the speed up/down determining unit determines whether the deviation value falls within a second specific interval, wherein the second specific interval has a second upper limit value and a second lower limit value; when the deviation value is larger than the second upper limit value, the speed up/down determining unit increases the clock rate; when the deviation value is less than the second lower limit value, the speed up/down determining unit decreases the clock rate; when the deviation value falls within the second specific interval, the speed up/down determining unit maintains the clock rate.

13. The electronic device according to claim 12, wherein the second upper limit value is a positive integer, and the second lower limit value is a negative integer.

14. The electronic device according to claim 10, wherein the first upper limit value is the half of packet buffer number of the FIFO buffer adding a first specific value, and the first lower limit value is the half of packet buffer number of the FIFO buffer subtracting a second specific value, wherein the first specific value and the second specific value are positive integers.

15. The electronic device according to claim 9, wherein the first upper limit value is the half of packet buffer number of the FIFO buffer adding a first specific value, and the first lower limit value is the half of packet buffer number of the FIFO buffer subtracting a second specific value, wherein the first specific value and the second specific value are positive integers.

16. The electronic device according to claim 6, wherein the second upper limit value is a positive integer, and the second lower limit value is a negative integer.

* * * * *